US009395912B2

(12) United States Patent
 Li

(10) Patent No.: US 9,395,912 B2
(45) Date of Patent: Jul. 19, 2016

(54) INFORMATION PROCESSING METHOD AND ELECTRONIC DEVICE

(71) Applicants:Beijing Lenovo Software Ltd., Beijing (CN); Lenovo (Beijing) Limited, Beijing (CN)

(72) Inventor: Kun Li, Beijing (CN)

(73) Assignees: Lenovo (Beijing) Limited (CN); Beijing Lenovo Software Ltd. (CN)

( * ) Notice: Subject to any disclaimer, the term of this patent is extended or adjusted under 35 U.S.C. 154(b) by 61 days.

(21) Appl. No.: 14/498,437

(22) Filed: Sep. 26, 2014

(65) Prior Publication Data

US 2015/0177900 A1   Jun. 25, 2015

(30) Foreign Application Priority Data

Dec. 19, 2013  (CN) .......................... 2013 1 0702986

(51) Int. Cl.
 *G06F 3/041*   (2006.01)
 *G06F 3/0488*   (2013.01)
 *G06F 3/0484*   (2013.01)

(52) U.S. Cl.
 CPC ........ *G06F 3/04883* (2013.01); *G06F 3/04845* (2013.01)

(58) Field of Classification Search
 CPC combination set(s) only.
 See application file for complete search history.

(56) References Cited

U.S. PATENT DOCUMENTS

| 4,415,927 | A | * | 11/1983 | Penney | .................. | H04N 17/00 324/76.11 |
| 5,483,261 | A | * | 1/1996 | Yasutake | ............ | G06K 9/00335 178/18.03 |
| 7,015,894 | B2 | * | 3/2006 | Morohoshi | ......... | G06F 3/03545 345/156 |
| 7,218,314 | B2 | * | 5/2007 | Itoh | ....................... | G06F 3/0418 178/19.07 |
| 2009/0273571 | A1 | * | 11/2009 | Bowens | .............. | G06F 3/03547 345/173 |
| 2013/0128364 | A1 | * | 5/2013 | Wheeler | ................ | A61B 3/113 359/630 |

* cited by examiner

*Primary Examiner* — Van Chow
(74) *Attorney, Agent, or Firm* — Schwegman, Lundberg & Woessner, P.A.

(57) ABSTRACT

The present disclosure discloses a method for processing information and an electronic device. The method comprises: displaying an object on a touch display unit of an electronic device; determining a central axis of the displayed object; acquiring movement information of the displayed object in the case that user's operation associated with the displayed object on the touch display unit is detected; and, adjusting the central axis of the displayed object during a moving process of the displayed object corresponding to the movement information, the central axis of the displayed object is parallel to moving trajectory corresponding to the movement information in the case that the displayed object stops moving.

14 Claims, 3 Drawing Sheets

INFORMATION PROCESSING METHOD AND ELECTRONIC DEVICE

CROSS-REFERENCE TO RELATED APPLICATION(S)

This application claims priority to Chinese Application No. 201310702986.2, entitled "METHOD AND ELECTRONIC DEVICE FOR PROCESSING INFORMATION", filed on Dec. 19, 2013, which is incorporated herein by reference in their entirety.

TECHNICAL FIELD

The present disclosure relates to the field of electronic technology, in particular, to a method for processing information and an electronic device.

BACKGROUND

With the rapid development of electronic technology, more and more electronic devices, such as, tablet computers, notebook computers, mobile phones, and etc. have come into people's daily life.

Further, electronic devices with large screen also come into our lives. More and more functions, such as, web browsing, movie watching, picture downloading, or the like, are embedded into this type of electronic devices. This type of electronic device may be used by multiple users simultaneously for different operations, while the operation of each user is not interfered by another. Alternatively, multiple users may share operations. For example, in the case that a device with a large screen is in a mode of lying flat, if a user at one end selects a picture or an album cover, the user can "throw", by dragging, the picture or the album cover to a user at the other end for view. Of course, in addition to a picture, other things, such as an electronic book, some web page, a movie, or the like may be shared with other users in this manner.

During the implementation of the present application, the inventor found that, since the orientation of a picture is kept unchanged relatively in the case that the picture is sliding, a user at the other end or a user at the diagonally opposite corner has to adjust the orientation of the picture by him-/herself to put it straight after the user "receives" the picture. For example, FIG. 2 is a schematic diagram showing a user A "throwing" some picture to a user B for view, wherein the dotted line indicates a trajectory of the picture. When the user B receives the picture, the orientation of the picture is opposite to the orientation in which the user is viewing, thus user experience is not good.

SUMMARY

According to embodiments of the present disclosure, a method for processing information and an electronic device are provided.

In one aspect, a method for processing information is disclosed, the method comprises: displaying an object on a touch display unit of an electronic device; determining a central axis of the displayed object; acquiring movement information of the displayed object in the case that user's operation associated with the displayed object on the touch display unit is detected; and, adjusting the central axis of the displayed object during a moving process of the displayed object corresponding to the movement information, the central axis of the displayed object is parallel to moving trajectory corresponding to the movement information in the case that the displayed object stops moving.

Preferably, said determining a central axis of the displayed object is performed based on display content and display size of the displayed object.

Preferably, said determining a central axis of the displayed object is performed further based on a feature of the display content of the displayed object. Preferably, the feature comprises a standing orientation of the display content.

Preferably, said acquiring movement information of the displayed object comprises: acquiring speed information and angle information associated with user's operation on the displayed object; acquiring the moving trajectory of the displayed object based on the angle information; and. acquiring a moving time period of the displayed object based on the moving trajectory and the speed information.

Preferably, said adjusting the central axis of the displayed object further comprises: controlling, based on the moving trajectory and the moving time period, the displayed object to symmetrically rotate with respect to the central axis of the displayed object during the moving process of the displayed object corresponding to the movement information, such that the central axis of the displayed object is parallel to the moving trajectory corresponding to the movement information in the case that the displayed object stops moving.

Preferably, said controlling the displayed object to symmetrically rotate with respect to the central axis of the displayed object comprises: acquiring a force exerted on the displayed object in the case that user's operation associated with the displayed object on the touch display unit is detected; and, controlling the displayed object to symmetrically rotate with respect to the central axis of the displayed object and rotate in the direction of the exerted force.

In another aspect, an electronic device is disclosed. The electronic device having a touch display unit, the electronic device comprising: a determining unit, configured to determine a central axis of a displayed object which is displayed on the touch display unit; a first acquiring unit, configured to acquire movement information of the displayed object in the case that user's operation associated with the displayed object on the touch display unit is detected; and, an adjusting unit, configured to adjust the central axis of the displayed object during a moving process of the displayed object corresponding to the movement information, such that the central axis of the displayed object is parallel to the moving trajectory corresponding to the movement information in the case that the displayed object stops moving.

Preferably, the determining unit is further configured to: determine the central axis of the displayed object based on display content and display size of the displayed object.

Preferably, the displayed object is a picture, and the determining unit is further configured to determine the central axis of the displayed object further based on a feature of the display content of the displayed object. Preferably, the feature comprises a standing orientation of the display content.

Preferably, the first acquiring unit is further configured to: acquire speed information and angle information associated with user's operation on the displayed object; acquire the moving trajectory of the displayed object based on the angle information; and acquire a moving time period of the displayed object based on the moving trajectory and the speed information.

Preferably, the adjusting unit is further configured to: control, based on the moving trajectory and the moving time period, the displayed object to symmetrically rotate with respect to the central axis of the displayed object during the moving process of the displayed object corresponding to the movement information, such that the central axis of the displayed object is parallel to the moving trajectory corresponding to the movement information in the case that the displayed object stops moving.

Preferably, the adjusting unit comprises: a second acquiring unit configured to acquire a force exerted on the displayed object in the case that the user operates the displayed object on the touch display unit; and a controlling unit configured to control the displayed object to symmetrically rotate with respect to the central axis of the displayed object and rotate in the direction of the exerted force.

DETAILED DESCRIPTION

An embodiment of the present disclosure provides a method for processing information and an electronic device to address the technical problem in the prior art that an electronic device cannot change the display orientation of a picture during a throwing process of the picture, resulting in a poor user experience. The general concept behind the solutions is set forth as below.

In the present disclosure, in the case that an object is displayed on a touch display unit, the central axis of the displayed object is determined; in the case that a user operates the displayed object on the touch display unit, user's operation associated with the displayed object on the touch display unit is detected, the movement information of the displayed object is acquired; and the central axis of the displayed object is adjusted during the moving process of the displayed object corresponding to the movement information, such that the central axis of the displayed object is parallel to moving trajectory corresponding to the movement information in the case that the displayed object stops moving. In this way, the central axis of the displayed object may be adjusted duly during the moving process of the displayed object such that the central axis is parallel to the moving trajectory in the case that the displayed object stops moving, in order for the user who receives the displayed object to be able to view the displayed object normally without additional manual operations of the user on the displayed object. Thereby, the user experience is improved.

Technical solutions of the present disclosure will be described in detail with reference to the drawings and specific embodiments. It is to be understood that the embodiments and specific features in the embodiments of the present disclosure are detailed illustrations of the technical solutions of the present disclosure, but not limitation to technical solutions of the present disclosure. The embodiments of the present disclosure and the specific features thereof may be combined with each other without any conflict.

Embodiment 1

In an embodiment of the present application, a method for processing information is described.

In particular, the method is applied in an electronic device having a touch display unit.

The electronic device in the present disclosure may be a portable device with a touch function, such as, a tablet computer, a smart phone, and etc. . . . Alternatively, the electronic device in the present disclosure may be a large touch device in a desktop form.

These electronic devices may be operated by one or more persons concurrently. If multiple persons operate the electronic device, they may interact with each other, such as, performing picture exchange, chatting, or the like.

Figure 1:
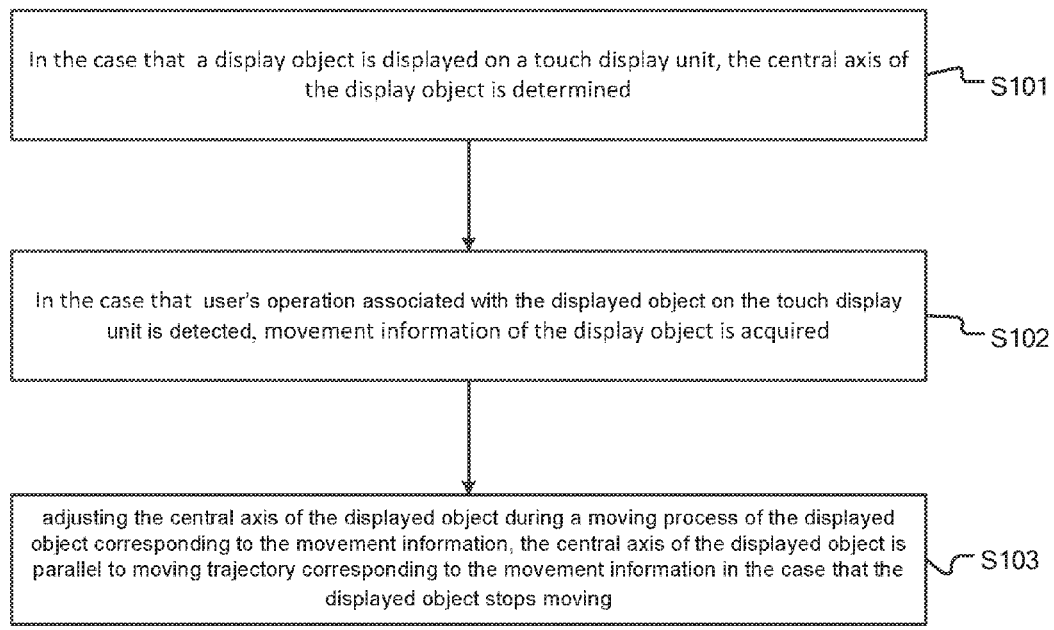
FIG. 1 is a flow chart of a method for processing information according to an embodiment of the present application.

Referring to FIG. 1, a specific implementation of the method for processing information according to an embodiment of the present application is as follows:

S101, when an object is displayed on a touch display unit of an electronic device, a central axis of the displayed object is determined.

Figure 2:
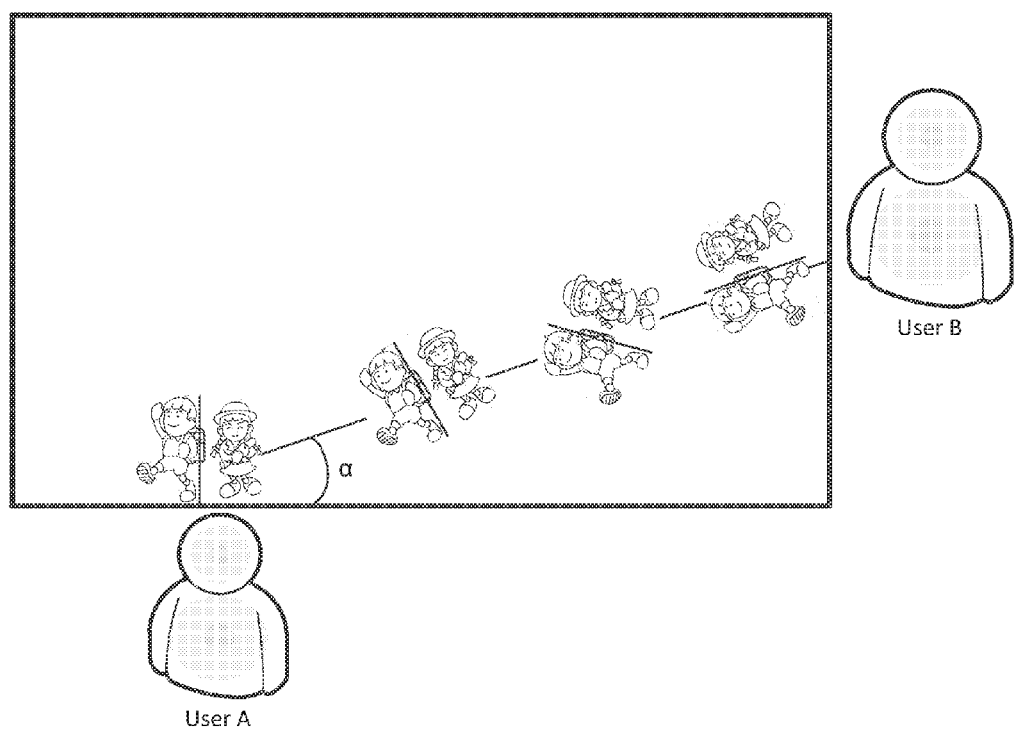
FIG. 2 is a schematic diagram showing a user A and a user B operating a large electronic device according to an embodiment of the present application.

In a specific implementation, referring to FIG. 2, the electronic device is a large electronic device in a desktop form, and a user A and a user B may operate the electronic device simultaneously. Assuming user A is viewing a picture, the picture here is an example of the displayed object.

Further, it is needed to determine the central axis of the displayed object.

To be specific, the central axis of the displayed object is determined based on display content and display size of the displayed object.

In an implementation, the picture viewed by the user A is taken as an example. The display size of this picture is 800*600, and the display content comprises two animated characters who are standing straight with respect to the user A. Based on the information, the central axis of the displayed object can be determined.

Figure 3:
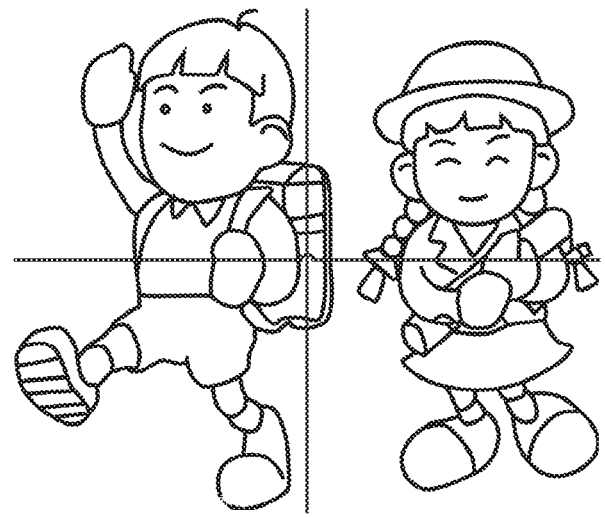
FIG. 3 is a schematic diagram showing the central axes of a picture viewed by the user A according to an embodiment of the present application.

Typically, the number of the central axes of the displayed object determined based on the display size of the picture is two. For example, two central axes are shown in FIG. 3. Further, a particular central axis is further determined based on the feature of the display content of the picture. For example, based on the standing orientation of the two animated characters in the picture, the central axis parallel to the standing orientation is determined as the central axis of the displayed object.

Further, following steps will be executed after the central axis is determined.

S102, movement information of the displayed object is acquired in the case that user's operation associated with the displayed object on the touch display unit is detected.

In a specific implementation, there are a plurality of manners in which the user operates the displayed object on the touch display unit, such as, for example, editing the displayed object, cutting out the displayed object, or transferring the displayed object to another user for view in a "throwing out" manner.

Further, the acquiring of movement information of the displayed object in the case that a user operates the displayed object on the touch display unit specifically comprises following steps.

speed information and angle information associated with user's operation on the displayed object are acquired in the case that the user operates the displayed object on the touch display unit;

the moving trajectory of the displayed object is acquired based on the angle information; and the moving time period of the displayed object is acquired based on the moving trajectory and the speed information.

Under the assumption that the user A transfers in a "throwing out" manner a picture having two animated characters to a user B for view on the touch display unit. At the moment of the "throwing out", the angle information of the "throwing out" and the speed information of the "throwing out" will be acquired by the electronic device.

In particular, the throwing angle is determined with the side, at which the user A is located, being the baseline. In the case that the picture is moving on the touch display unit, it moves in a trajectory of a straight line. Therefore, once the electronic device knows the angle information for the "throwing out" of the picture, it knows the moving trajectory of the picture on the touch display unit. Referring to FIG. 2 for details, the throwing angle of the picture is α. Based on the angle of α, the electronic device may be aware of that the moving trajectory of the picture is the trajectory of a straight line located between the user A and the user B. Further, specific values of this straight line trajectory may also be known.

Furthermore, once the distance value of the movement of the picture is acquired, the moving time period of the picture may be calculated based on the acquired distance value in conjunction with the speed information acquired at the time of throwing out of the picture.

Under the assumption that the speed at the time of throwing out of the picture is $V_0$, $V_0=3$ m/s.

The distance of the movement of the picture is S, $S=5$ m.

The speed at the time when the picture stops moving is $V_t$, $V_t=0$ m/s. This is because the picture stops just at the user B when the picture is transferred to the user B, in order to be viewed by the user B.

Therefore, the acceleration of the picture may be further calculated, $a=(V_t-V_0)/t$, where t is the moving time period of the picture.

Further, $S=v_0 t+0.5\ at^2$.

Based on the above two equations, the moving time period of the picture may be derived, $t=2.25$ s.

In the case that the moving time period of the picture is known, then following steps may be executed.

S103, during the moving process of the displayed object corresponding to the movement information, the central axis of the displayed object is adjusted such that the central axis of the displayed object is parallel to moving trajectory corresponding to the movement information in the case that the displayed object stops moving.

The specific implementation is as follows:

During the moving process of the displayed object corresponding to the movement information, the displayed object is controlled to symmetrically rotate with respect to the central axis of the displayed object based on the moving trajectory and the moving time period, such that the central axis of the displayed object is parallel to the moving trajectory corresponding to the movement information in the case that the displayed object stops moving.

During the rotation, rotation is performed in following steps:

For the electronic device, in the case that the user operates the displayed object on the touch display unit, the electronic device will acquire force exerted on the displayed object; and then the displayed object is controlled to symmetrically rotate with respect to the central axis of the displayed object and rotate in the direction of the exerted force.

In a specific implementation of the same example above, with the above calculations, the picture will travel along the moving trajectory for 2.25 s and stop in front of the user B after the picture viewed by the user A is "throw out" by the user A. During the moving process, the electronic device will control the picture to symmetrically rotate with respect to the central axis. In particular, the picture may rotate clockwise or counterclockwise (for example, the rotation direction of the picture in FIG. 2). The rotation direction of the picture is decided by the force received by the picture from the user at the time in the case that the user operates the picture.

Further, at the same time when the picture moving along the moving trajectory, the electronic device will adjust the central axis of the picture timely such that the central axis of the displayed object is parallel to the moving trajectory corresponding to the movement information when the displayed object stops moving.

In summary, the method described in above embodiment may adjust the central axis of the picture during the moving process of the picture such that its central axis is parallel to the moving trajectory in the case that the picture stops moving, in order for the user who receives the picture to view the picture in a normal manner without additional operations on the picture. Thereby the user experience is improved.

Based on the same inventive concept, the following embodiment describes an electronic device.

Embodiment 2

In an embodiment of the present application, an electronic device is described.

In particular, the electronic device has a touch display unit. The electronic device in the present disclosure may be a portable device having a touch function. Such a portable device may be, such as, a tablet computer, a smart phone, or the like. The electronic device in the present disclosure may also be a large touch device in a desktop form.

These electronic devices may be operated by one or more persons concurrently. If multiple persons operate concurrently, they may interact with each other, for example, performing picture exchange, chatting with each other, or the like.

Figure 4:
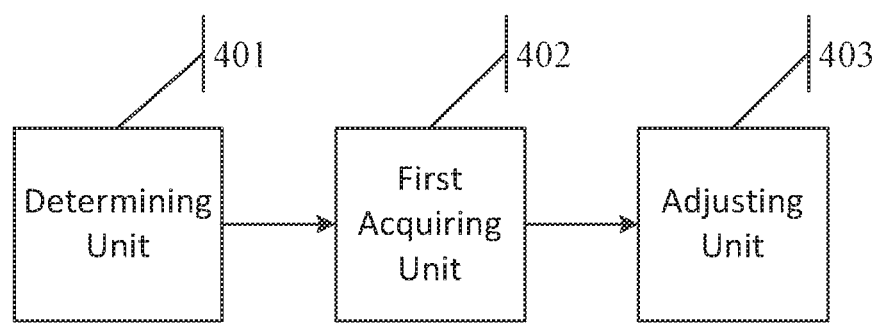
FIG. 4 is a schematic diagram of an electronic device according to an embodiment of the present application.

Referring to FIG. 4 below, the electronic device specifically comprises:

a determining unit 401 configured to determine the central axis of a displayed object which is displayed on the touch display unit;

a first acquiring unit 402 configured to acquire movement information of the displayed object in the case that user's operation associated with the displayed object on the touch display unit is detected; and an adjusting unit 403 configured to adjust the central axis of the displayed object during the moving process of the displayed object corresponding to the movement information, such that the central axis of the displayed object is parallel to the moving trajectory corresponding to the movement information in the case that the displayed object stops moving.

Further, the determining unit 401 is specifically configured to: determine the central axis of the displayed object based on display content and display size of the displayed object.

Further, the first acquiring unit 402 is specifically configured to: acquire speed information and angle information associated with user's operation on the displayed object in the case that user's operation associated with the displayed object on the touch display unit is detected;

the moving trajectory of the displayed object is acquired based on the angle information; and the moving time period of the displayed object is acquired based on the moving trajectory and the speed information.

Further, the adjusting unit 403 is specifically configured to: control, based on the moving trajectory and the moving time period, the displayed object to symmetrically rotate with respect to the central axis of the displayed object during the moving process of the displayed object corresponding to the movement information, such that the central axis of the displayed object is parallel to the moving trajectory corresponding to the movement information in the case that the displayed object stops moving.

Further, the adjusting unit 403 comprises:

a second acquiring unit configured to acquire a force exerted on the displayed object in the case that user's operation associated with the displayed object on the touch display unit is detected; and a controlling unit configured to control the displayed object to symmetrically rotate with respect to the central axis of the displayed object and rotate in the direction of the exerted force.

With one or more embodiments of the present disclosure, following technical effects may be achieved:

In the present disclosure, in the case that an object is displayed on a touch display unit, the central axis of the displayed object is determined; in the case that user's operation associated with the displayed object on the touch display unit is detected, the movement information of the displayed object is acquired; and the central axis of the displayed object is adjusted during the moving process of the displayed object corresponding to the movement information, such that the central axis of the displayed object is parallel to the moving trajectory corresponding to the movement information in the case that the displayed object stops moving. In this way, the central axis of the displayed object may be adjusted duly during the moving process of the displayed object such that the central axis is parallel to the moving trajectory in the case that the displayed object stops moving, in order for the user who receives the displayed object to view the displayed object normally without additional manual operations of the user on the displayed object. Thereby, the user experience is improved.

It should be appreciated by one skilled in the art that the embodiments of the present disclosure may be provided as methods, systems, or computer program products. Therefore, the present disclosure may be implemented in pure hardware, pure software, or the combination of software and hardware. Further, the present disclosure may be implemented as a computer program product embodied on one or more computer usable storage media (comprising but not limited to disk storage, CD-ROM, optical storage, etc.) having computer usable program code therein.

The present disclosure is described with reference to flow charts and/or block diagrams of the methods, devices (systems), and computer program products according to embodiments of the present disclosure. It is to be understood that each flow and/or block in the flow charts and/or block diagrams and any combination of flow and/or block in the flow charts and/or block diagrams may be implemented by computer program instructions. These computer program instructions may be provided to processors of general purpose computers, special purpose computers, embedded processing machines or any other programmable data processing devices to form a machine such that means having functions specified in one or more flows in the flow charts and/or one or more blocks in the block diagrams can be implemented by instructions executed by processors of the computers or any other programmable data processing devices.

The computer program instructions may also be stored in computer readable memories which may guide the computers or any other programmable data processing devices to function in such a manner that the instructions stored in these computer readable memories may generate manufactures comprising instruction means, the instruction means implementing functions specified in one or more flows in the flow charts and/or one or more blocks in the block diagrams.

These computer program instructions may also be loaded to computers or any other programmable data processing devices such that a series of operation steps are performed on the computers or any other programmable devices to generate processing implemented by the computers. Therefore, the instructions executed on the computers or any other programmable devices provide steps for implementing functions specified in one or more flows in the flow charts and/or one or more blocks in the block diagrams.

In particular, the computer program instructions corresponding to the method for processing information according to embodiments of the present application may be stored on a storage medium, such as, an optical disc, a hard drive, a U-disk. When the computer program instruction in the storage medium corresponding to this method for processing information is loaded or executed by an electronic device, it comprises steps of:

displaying an object on a touch display unit of an electronic device;

determining a central axis of the displayed object;

acquiring movement information of the displayed object in the case that user's operation associated with the displayed object on the touch display unit is detected; and adjusting the central axis of the displayed object during a moving process of the displayed object corresponding to the movement information, the central axis of the displayed object is parallel to moving trajectory corresponding to the movement information in the case that the displayed object stops moving.

Further, said determining a central axis of the displayed object is performed based on display content and display size of the displayed object.

Further, said acquiring movement information of the displayed object specifically comprises:

acquiring speed information and angle information associated with user's operation on the displayed object;

acquiring the moving trajectory of the displayed object based on the angle information; and acquiring a moving time period of the displayed object based on the moving trajectory and the speed information.

Further, said adjusting the central axis of the displayed object specifically comprises:

controlling, based on the moving trajectory and the moving time period, the displayed object to symmetrically rotate with respect to the central axis of the displayed object during the moving process of the displayed object corresponding to the movement information, such that the central axis of the displayed object is parallel to the moving trajectory corresponding to the movement information in the case that the displayed object stops moving.

Further, said controlling the displayed object to symmetrically rotate with respect to the central axis of the displayed object specifically comprises:

acquiring a force exerted on the displayed object in the case that user's operation associated with the displayed object on the touch display unit is detected; and controlling the displayed object to symmetrically rotate with respect to the central axis of the displayed object and rotate in the direction of the exerted force.

What is claimed is:

1. A method for processing information, comprising:
displaying an object on a touch display unit of an electronic device;
determining a central axis of the displayed object;

acquiring movement information of the displayed object in the case that user's operation associated with the displayed object on the touch display unit is detected; and adjusting the central axis of the displayed object during a moving process of the displayed object corresponding to the movement information, the central axis of the displayed object is parallel to moving trajectory corresponding to the movement information in the case that the displayed object stops moving.

2. The method according to claim 1, wherein said determining a central axis of the displayed object is performed based on display content and display size of the displayed object.

3. The method according to claim 2, wherein said determining a central axis of the displayed object is performed further based on a feature of the display content of the displayed object.

4. The method according to claim 3, wherein the feature comprises a standing orientation of the display content.

5. The method according to claim 1, wherein said acquiring movement information of the displayed object comprises:
    acquiring speed information and angle information associated with user's operation on the displayed object;
    acquiring the moving trajectory of the displayed object based on the angle information; and
    acquiring a moving time period of the displayed object based on the moving trajectory and the speed information.

6. The method according to claim 5, wherein said adjusting the central axis of the displayed object further comprises:
    controlling, based on the moving trajectory and the moving time period, the displayed object to symmetrically rotate with respect to the central axis of the displayed object during the moving process of the displayed object corresponding to the movement information, such that the central axis of the displayed object is parallel to the moving trajectory corresponding to the movement information in the case that the displayed object stops moving.

7. The method according to claim 6, wherein said controlling the displayed object to symmetrically rotate with respect to the central axis of the displayed object comprises:
    acquiring a force exerted on the displayed object in the case that user's operation associated with the displayed object on the touch display unit is detected; and
    controlling the displayed object to symmetrically rotate with respect to the central axis of the displayed object and rotate in the direction of the exerted force.

8. An electronic device, the electronic device having a touch display unit, the electronic device comprising:
    a determining unit, configured to determine a central axis of a displayed object which is displayed on the touch display unit;
    a first acquiring unit, configured to acquire movement information of the displayed object in the case that user's operation associated with the displayed object on the touch display unit is detected; and
    an adjusting unit, configured to adjust the central axis of the displayed object during a moving process of the displayed object corresponding to the movement information, such that the central axis of the displayed object is parallel to the moving trajectory corresponding to the movement information in the case that the displayed object stops moving.

9. The electronic device according to claim 8, wherein the determining unit is further configured to: determine the central axis of the displayed object based on display content and display size of the displayed object.

10. The electronic device according to claim 9, wherein the displayed object is a picture and the determining unit is further configured to determine the central axis of the displayed object further based on a feature of the display content of the displayed object.

11. The electronic device according to claim 10, wherein the feature comprises a standing orientation of the display content.

12. The electronic device according to claim 8, wherein the first acquiring unit is further configured to:
    acquire speed information and angle information associated with user's operation on the displayed object;
    acquire the moving trajectory of the displayed object based on the angle information; and
    acquire a moving time period of the displayed object based on the moving trajectory and the speed information.

13. The electronic device according to claim 12, wherein the adjusting unit is further configured to: control, based on the moving trajectory and the moving time period, the displayed object to symmetrically rotate with respect to the central axis of the displayed object during the moving process of the displayed object corresponding to the movement information, such that the central axis of the displayed object is parallel to the moving trajectory corresponding to the movement information in the case that the displayed object stops moving.

14. The electronic device according to claim 12, wherein the adjusting unit comprises:
    a second acquiring unit, configured to acquire a force exerted on the displayed object in the case that user's operation associated with the displayed object is detected; and
    a controlling unit, configured to control the displayed object to symmetrically rotate with respect to the central axis of the displayed object and rotate in the direction of the exerted force.

* * * * *